United States Patent Office 3,198,559
Patented Aug. 3, 1965

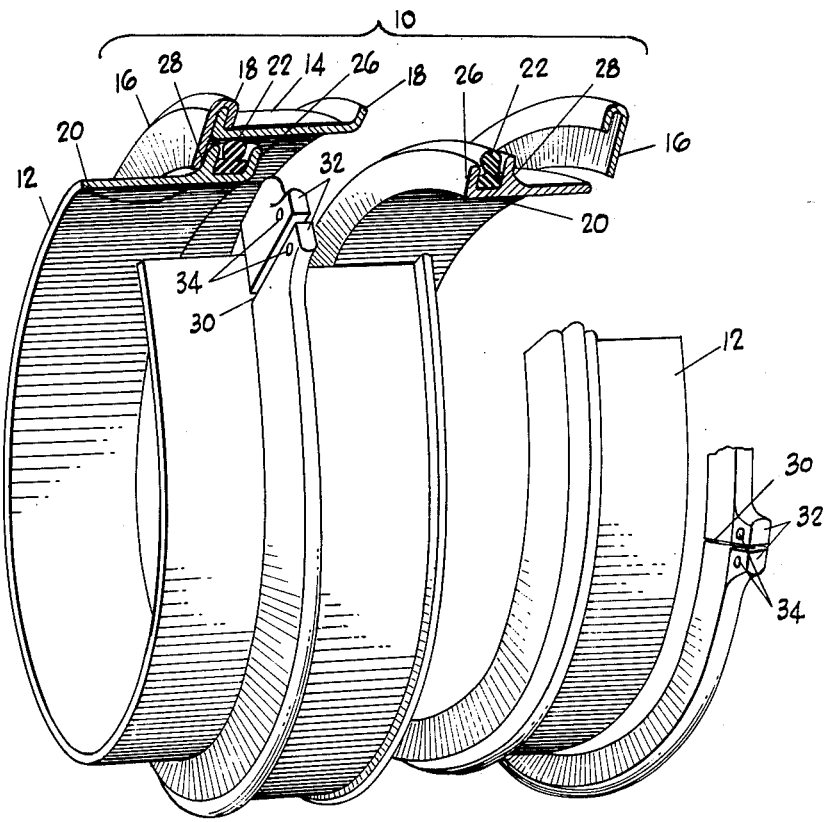
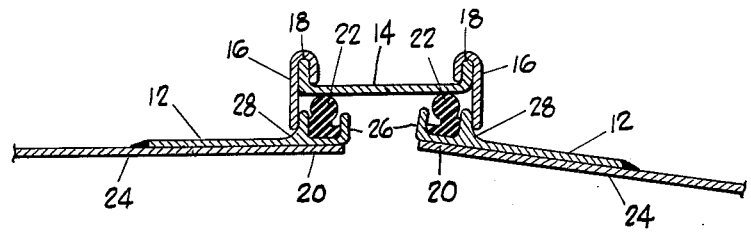

3,198,559
FLEXIBLE COUPLING FOR RIGID MEMBERS
Raymond E. Snyder, Playa Del Rey, Calif., assignor to Douglas Aircraft Company, Inc., Santa Monica, Calif.
Filed May 11, 1960, Ser. No. 28,436
2 Claims. (Cl. 285—233)

This invention relates to a flexible coupling for use in connecting rigid conduits or ducts in air conditioning and pneumatic systems in aircraft.

The coupling of the present invention is especially useful in large aircraft wherein the pressures may range from 5 to 15 pounds per square inch in the air conditioning system and from 15 to 45 pounds per square inch in the pneumatic system and wherein the temperatures may range from −65° F. to 300° F. in the air conditioning system and from −65° F. to 500° F. in the pneumatic system. In order to withstand these pressures and temperatures and to handle the great volume of air passing through these systems, the ducts contemplated for use with the present coupling are made of stainless steel or aluminum and generally have thin walls (to save weight), plain ends, and relatively large diameters, ranging from 5 to 7 inches.

Because of space limitations, many of these ducts are curved or bent to avoid adjacent structure and equipment and are disposed at varying angles to the longitudinal and horizontal axes of the aircraft. Thus, in joining these ducts, there is the problem of obtaining proper alignment of the ducts and also, in some cases, the problem of compensating for any dimensional discrepancies due to manufacturing tolerances. Once the ducts are joined, provision must also be made for movement of the ducts which may be due to thermal expansion and due to any flexure of the structure containing the ducts, such as that commonly occurring in the wing.

The coupling of the present invention solves these problems by providing for a flexible jointure comprised of end members which are preferably welded to the ducts to be joined, a central collar or body portion into which the end members telescope, resilient sealing elements held by the end pieces and permitting axial and angular movement of the end members within the collar as well as providing a seal for the jointure, and snap rings retaining the end members within the collar. Moreover, the present coupling has sufficient strength and durability to withstand the pressures and temperatures encountered in the systems and also to take care of any end loads which may be imposed upon it. At the same time, the present coupling is easily assembled and disassembled, has light weight, and has a small envelope size in relation to the ducts so as to be fully efficient for aircraft use.

These and other novel features of the coupling of the present invention can be better understood by reference to the accompanying drawing in which:

FIG. 1 is a perspective view of one embodiment of the coupling, partly in section and partly in exploded view; and FIG. 2 is a sectional elevation view of the coupling of FIG. 1, showing the preferred method of attaching the coupling to the ducts being joined.

As shown in FIG. 1, the coupling, generally designated as 10, comprises two cylindrical end members 12 adapted to fit within a cylindrical collar or body 14 and to be confined therein by snap rings 16 hooked over flanged ends 18 of the body. The end members have a double-flanged or channel-shaped end 20 to receive a resilient sealing element 22 which provides the sealing action in the coupling and permits axial and angular movement of the end members within the collar or body.

As shown in FIG. 2, the end members 12 are preferably attached, either by fusion welding or resistance seam welding, over the ends of the ducts 24 being joined. However, the end members may also be attached to the ducts by butt welding them to the ends of the ducts or by use of a ring nut connection. The welding of the end members is done prior to installation of the ducts in the aircraft. Welding of the end members, which are machined parts, to the ducts obviates the necessity of maintaining close tolerances on the ducts themselves and thus greatly reduces their fabrication costs. The plain end ducts can be formed either by wrapping sheet stock around a mandrel and seam welding the joint or by butt welding two half sections which have been contoured by a drop hammer, whereas ducts with special ends would very likely have to be machined in order to maintain the close tolerances required for proper sealing action. The conventional beaded tubing or duct has been found to be lacking in strength to take the end loads which may be encountered in the systems contemplated by the present invention.

The present coupling may be used in such a manner that it will be in tension or in compression with regard to the pressure in the system. Compression loading would occur when the ducts are tied down to adjoining structure by suitable brackets near the ends of the ducts being joined so that the load will be transmitted through the brackets into the structure and there will be no end loads imposed upon the coupling itself. A tension loading would occur when the ducts are not supported at the joint ends but are hanging freely. Here, the coupling will be subject to end loads. When the coupling will be subject to compression loading, the outer or endmost flange 26 and the inner flange 28 of the end member 12 may be substantially the same in their respective diameters and thicknesses. However, the endmost flange 26 is generally made with a smaller diameter than the inner flange 28 in order to save weight; at the same time, there is no sacrifice in strength since the primary function of the endmost flange 26 is to simply retain sealing element 22. Generally, the thickness of the endmost flange will be approximately the same as the wall thickness of the end member 12. When the coupling will be subject to tension loading, the inner flange 28 will have a greater thickness than the endmost flange 26, as shown in FIGS. 1 and 2. The exact difference in thickness would depend upon the amount of end load imposed upon the coupling, but in some cases the thickness of the inner flange 28 may be as much as approximately twice that of the endmost flange 26. Also, to further strengthen inner flange 28, when under tension loading, it is provided with a fillet of generous radius on the side adjacent to the snap rings 16. No fillet is required when the coupling is under compression loading.

The annular sealing element 22 which rests in the channel formed by flanges 26 and 28 of the end member 12 is comprised of a sealing compound which is resilient enough to permit easy attachment of the element to the end member. Elastomers having a silicone polymer base have been found to be the most suitable since they possess sufficient resiliency and further are resistant to the temperatures encountered in the air conditioning and pneumatic systems where the present coupling is used. A small amount of lubricant, such as graphite or silicone fluid, may also be used to facilitate sliding movement of the end member 12 within the body 14.

As shown in FIGS. 1 and 2, the sealing element 22 is rounded or bulbed in the upper portion, which yieldingly contacts the interior surface of the body 14, to reduce wear and to facilitate angular movement of the end member within the body. The element is rectangular in the lower portion which seats in the channel formed by the flanges 26, 28 of the end member 12. The rectangular shape is designed to prevent any rolling or spiralling of the sealing element during movement of the end members within the body, a deficiency which occurs with conventional O rings. Although the sealing element is shown in asymmetrical shape in FIGS. 1 and 2, a symmetrical shape is also contemplated as falling within the scope of the present invention. Such a symmetrical shape will prevent any confusion in the installation of the sealing element in the end member and will at the same time give the same sealing action as the shape shown in the figures.

The sealing action is obtained principally by an interference fit between the upper rounded portion of the sealing element and the interior surface of body 14. The degree of interference will be such that even with the maximum angular movement, about 5° in the embodiment shown in FIG. 1, the seal will still be maintained. Pressure in the system also forces the sealing element to stay in contact with the body, and thus helps in maintaining the seal.

The snap rings 16 are shaped in the form of the letter J and are split at 30 so that they may be opened and fitted over the flanges 18 of the body 14. The required springiness or tension in the rings is provided by overlapping the rings at the split during heat treating. The rings also have protuberances 32 to aid in locking and unlocking of the end members within the body and, where desired, to provide for the securing of the ring ends by means of a safety lock wire (not shown) which can be inserted through holes 34 drilled through the protuberances.

As previously mentioned, the preferred method of assembling the components of the coupling is to fit the end members 12 over the ends of the ducts 24 to be joined and then weld the end members in place, as shown in FIG. 2. The assembly is then completed by placing sealing elements 22 within the channel formed by flanges 26 and 28, slipping body 14 over the sealing elements and then snapping the ring 16 over the body and the end members. Should the coupling need to be disassembled for purposes of inspection or replacement of the sealing elements, this can be done by unsnapping the rings and sliding the body to either side to expose the sealing elements. Thus it will be seen that the assembly and disassembly of the coupling is very simply and quickly done.

Where the ducts being joined will be subject to considerable movement, two or more couplings in the embodiment shown in the figures are generally used in series. However, by extension of the length of the body 14, it is possible to eliminate one or more of these couplings, and thus decrease the total weight of the system.

Although the presently preferred embodiment of this invention has been shown and described, it is to be understood that the invention is susceptible to variation in form and construction within the scope of the appended claims.

I claim:

1. A coupling for flexibly connecting plain end ducts comprising cylindrical end members adapted for circumferential attachment over the ends of the ducts to be connected, said end members on each of said ducts having a channel at one end formed by outwardly directed inner and outer radial flanges, a large radius fillet formed at the junction between each of said inner flanges and a respective outer surface of each of said end members, a cylindrical sleeve having outwardly directed radial end flanges, said sleeve having an inside diameter greater than the outermost diameter of the inner flanges of the end members, annular sealing elements of a silicone polymer base, said elements having a rectangular lower portion seated in the channels of the end members and a bulbed upper portion in an interference fit with the interior surface of the sleeve and one piece resilient split snap rings having a straight first radial portion and a reversely bent peripheral portion terminating in an inwardly directed second radial portion of shorter length than said first radial portion, said two radial portions defining an inwardly opening channel,
    said rings being snapped over and resiliently retained about the end flanges of said sleeve and retained about said flanges against axial displacement, the inner periphery of said first radial portion engaging said large fillet of said inner flange to thereby retain the ducts in fluid sealed connected relation and to permit limited axial misalignment thereof.

2. A coupling as claimed in claim 1 wherein said end members are integral with and a part of said ducts.

References Cited by the Examiner

UNITED STATES PATENTS

| 344,312 | 6/86 | Guillemin. | |
| 1,247,235 | 11/17 | Diss. | |
| 1,605,872 | 11/26 | Tinnerman | 85—8.1 |
| 2,319,518 | 5/43 | Rau | 285—424 |
| 2,349,170 | 5/44 | Jackman | 285—95 |
| 2,521,127 | 9/50 | Price | 285—231 |
| 2,705,655 | 4/55 | Brown et al. | 277—207 X |
| 2,774,617 | 12/56 | Lanninger | 285—233 X |
| 2,880,017 | 3/59 | Anderson | 285—424 |
| 3,064,983 | 11/62 | Halterman | 285—110 X |

FOREIGN PATENTS

| 511,690 | 6/52 | Belgium. |
| 809,583 | 2/59 | Great Britain. |
| 401,302 | 7/09 | France. |
| 785,652 | 5/35 | France. |
| 909,478 | 12/45 | France. |

CARL W. TOMLIN, *Primary Examiner.*

EDWARD C. ALLEN, HUNTER S. BOURNE, Jr.
*Examiners.*